United States Patent [19] [11] 4,244,925
Subbanna et al. [45] * Jan. 13, 1981

| [54] | METHOD FOR PRODUCTION OF ALKALI METAL CHROMATES FROM CHROME ORES | |
|---|---|---|
| [75] | Inventors: | Somanahalli N. Subbanna, Camillus; Thomas R. Morgan, Solvay; Douglas G. Frick, La Fayette, all of N.Y. |
| [73] | Assignee: | Allied Chemical Corporation, Morris Township, Morris County, N.J. |
| [*] | Notice: | The portion of the term of this patent subsequent to Jul. 24, 1996, has been disclaimed. |
| [21] | Appl. No.: | 58,975 |
| [22] | Filed: | Jul. 20, 1979 |

Related U.S. Application Data

[63] Continuation-in-part of Ser. No. 851,230, Nov. 14, 1977, Pat. No. 4,162,295.

[51] Int. Cl.³ .................. C01G 37/14; C01G 31/00
[52] U.S. Cl. .................................. 423/61; 423/65; 423/68; 423/596
[58] Field of Search ............. 423/61, 53, 596, 68, 423/65

[56] References Cited
U.S. PATENT DOCUMENTS

| 2,576,445 | 11/1951 | Cole | 423/65 |
|---|---|---|---|
| 2,839,359 | 6/1958 | Dunning | 423/65 |
| 3,816,095 | 6/1974 | Bruen | 423/61 |
| 3,852,059 | 12/1974 | Bruen | 423/61 |
| 4,162,295 | 7/1979 | Subbana | 423/596 |

OTHER PUBLICATIONS

Doerner et al., "A Study of Methods for Producing Chromate Salts from Domestic Ores," Bulletin V, Sep. 1939, pp. 8-13.

*Primary Examiner*—Brian E. Hearn
*Attorney, Agent, or Firm*—Thomas D. Hoffman

[57] ABSTRACT

A method for producing alkali metal chromates by a single roast of chrome ores without the use of calcium oxide is disclosed. A double roast embodiment is also contemplated for obtainment of enhanced yields. The pollution and hygiene problems associated with the use of lime are substantially eliminated and only negligible amounts of alumina are found in the product chromate liquors without employing steps previously thought necessary. These advantages are achieved by controlling (1) the Bichromate Equivalent: aluminum oxide ratio in the mix, (2) the amount of alkali metal salts added to the mix, (3) the roasting time, (4) the composition and alkalinity of the liquor used for leaching the roast, and (5) the temperature employed. Recovery of vanadium values from the alkali metal chromate liquors is also disclosed.

23 Claims, No Drawings

METHOD FOR PRODUCTION OF ALKALI METAL CHROMATES FROM CHROME ORES

DESCRIPTION

CROSS-REFERENCE TO RELATED APPLICATION

This is a continuation-in-part of co-pending application, Ser. No. 851,230, filed Nov. 14, 1977, now U.S. Pat. No. 4,162,295.

BACKGROUND OF THE INVENTION

1. Field of the Invention

This invention relates to a method for the manufacture of alkali metal chromates from chrome ores by a lime-free roast wherein the extraction of alumina into the leach liquor is essentially eliminated by controlling a number of process variables within certain critical limits. While the method may operate with a single roasting step, a double roast produces enhanced yields.

2. Description of the Prior Art

It is well known that alkali metal chromates may be produced by roasting of chrome ore, soda ash and lime in an oxygen atmosphere. The roasting operation may be carried out either as a single or double roast at temperatures of around 1150° C., either in a rotary kiln or in a rotary hearth furnace. In a single roast operation, the roast leaving the kiln is cooled, leached, and washed to recover the soluble alkali metal chromate product. The residue left after leaching is either discarded or a part is recycled back to the kiln. In the double roast operations, all the residue from the first roast is recycled back to the process. A part of the residue may be recycled to the first roast as a diluent and the remaining part may be subjected to a second roast in the presence of additional soda ash. The roast leaving the second roast operation may then be cooled, leached and washed to recover soluble alkali metal chromate. The residue left behind is either discarded or a part recycled back to the process. Processes of this type are disclosed in prior art publications with many modifications.

In one modification, lime has been added to the mix to insolubilize and fix the alumina present as calcium aluminate compounds. The addition of the lime however, also forms calcium chromate compounds and these compounds are responsible for pollution and hygiene problems associated therewith. The lime is added to the roast mix to prevent extraction of alumina into the leached liquor in order to avoid the necessity of removing the alumina from the product liquor in recovery of the product. Removal of alumina from the product liquor is quite difficult because of the formation of gelatinous precipitates which are difficult to filter. The prior art discloses processes conducted in the absence of added lime as well as in the presence of added lime. For example, U.S. Pat. No. 797,323, a 1905 patent, discloses a double roast, lime-free process using a relatively high percentage of soda ash but no residue is recycled. The amount of soda ash is controlled to avoid fusion of the mass during roasting but, this system is not applicable to rotary kiln operations. Furthermore, excess alumina is extracted into the product liquors. A similar process is described in British Patent No. 270,143 wherein a lime-free roast is disclosed in the first step, and wherein the roast mix contains only a mixture of ore and soda ash with the soda ash being maintained in generally high amounts and with lime used in the second step.

A process is disclosed in U.S. Pat. No. 1,948,143 wherein a mixture of lime, soda ash, and leached residue from a preceding first stage roast, are used to roast the chrome ore. U.S. Pat. No. 2,199,929 discloses a continuous countercurrent leaching step in a lime-free double roast but it describes no procedure to prevent extraction of alumina into the leach liquor. Also, U.S. Pat. No. 1,752,863 discloses a method for the roasting of chromium ores in the presence of soda ash and lime with subsequent leaching of the products but wherein a portion of the leaching residue may be used to replace some of the lime in the initial step. A similar process may be found in U.S. Pat. No. 3,812,234 wherein recycle treatment residue is considered to be an equivalent diluent to dolomite, iron ore and the like, in the roasting of chromium ores with soda ash, but in this patent, the chromium-containing material is initially heated under fluidizing conditions with specific preheating and fluidizing procedures required for good recovery of products.

U.S. Pat. No. 3,819,800 discloses a lime-containing roasting process wherein a small amount of lime in the range of 1–3% is maintained in the roast mix and alumina is extracted together with alkali metal chromate in the product liquor with provisions made for removal of the alumina from the product liquor. U.S. Pat. No. 1,631,170 and British Pat. No. 1,057,678 disclose processes wherein lime-free roasting of chromium ores is carried out in the presence of soda ash and wherein leaching of the resulting product is carried out under acidic conditions. Sodium aluminate is produced in both processes and complicated separation steps are required to prevent extraction of alumina into the product chromate solutions.

All of these prior art processes indicate that various techniques have been used so as to conduct the roasting operation under conditions to minimize material costs and still recover good yields of the desired alkali metal chromate. The process of the present invention meets these objectives.

SUMMARY OF THE INVENTION

It is accordingly one object of the present invention to provide a method for the manufacture of alkali metal chromates from chromium ore by a single and double roasting embodiments wherein certain critical limitations are controlled within desired ranges in order to minimize extraction of alumina into the product chromate solution and also to avoid the addition of calcium oxide to the roasting mix.

It is a further object of the invention to provide a method for roasting chrome ore for recovery of alkali metal chromates which overcomes or otherwise mitigates problems of the prior art.

A still further object of the invention is to provide a method for the manufacture of alkali metal chromates from chrome ore by single and double roasting embodiments in the absence of added calcium oxide.

Other objects and advantages of the present invention will become apparent as the description thereof proceeds.

In satisfaction of the foregoing objects and advantages, there is provided by this invention a method for the manufacture of alkali metal chromates from chrome ore which comprises a lime-free roasting step procedure, the roast comprising reaction of the chromium ore with an alkali metal salt and diluent in an oxygen-containing atmosphere at a temperature in the range of about 900° to 1200° C., with a minimum roasting residence time of at least about 30 minutes, leaching the resulting roast-mix with a liquor having an alkalinity value in the pH range of about 4.5 to 12, separating the product liquor containing alkali metal chromate values from the resulting leached residue and recovering the alkali metal chromate values from the product liquor. The Bichromate Equivalent (defined below) to aluminum oxide ratio in the roasting mix is maintained in the range of about 1.5:1 to 10:1 and the amount of alkali metal salt is in the range of about 30 to 80 percent of the stoichiometric amount required to react with the chrome in the mix. The diluent is a member selected from the group consisting of pyrites cinder, iron oxide, magnesium oxide, leached residue from a previous roast and mixtures thereof.

In a preferred embodiment of the method of this invention, at least a portion of the diluent is leached residue from a previous roast. The roast mixture is contacted with oxygen-containing gas at about 1100° to 1200° C. for a period of about 45 to 360 minutes. Then, the hot roast mixture is cooled before leaching. In addition, the Bichromate Equivalent to aluminum oxide ratio in the mix is held in the range of about 3:1 to 4:1 while the amount of alkali metal salt is maintained in the range of about 40 to 55 percent of the stoichiometric amount required to react with the chrome in the mix.

In another specific embodiment, there is provided a method for the production of alkali metal chromates from chrome ore which comprises a lime-free double roasting procedure, the initial roast comprising reaction of the chromium ore with an alkali metal salt and a diluent in an oxygen-containing atmosphere at a temperature in the range of about 900° to 1200° C., with a minimum roasting residence time of at least about 30 minutes, leaching the resulting roast mix with a liquor having an alkalinity value in the pH range of about 4.5 to 12, separating the product liquor containing alkali metal chromate values from a resulting leached residue, transferring at least a portion of said residue to a second roast and roasting in the presence of an additional alkali metal salt in an oxygen-containing atmosphere at temperature of about 900° to 1200° C. for a minimum residence time of at least about 45 minutes, leaching the resulting mix to remove chromate values therefrom with a leach liquor having a pH of about 4.5 to 12. In the first step of the roast, it is important to maintain the Bichromate Equivalent (defined below) to aluminum oxide ratio in the mix in the range of about 3.0:1 to 10:1, and the amount of alkali metal salt in the range of about 35 to 80 percent of the stoichiometric amount required to react with the chrome in the mix. In the second roasting step the Bichromate Equivalent to aluminum oxide ratio in the mix is maintained in the range of about 1.5:1 to 4:1 and the amount of alkali metal salt is maintained in the range of about 30 to 60 percent of the stoichiometric amount required to react with the chrome in the mix. Optionally, the reaction in the second roasting step may also be effected in the presence of additional chrome ore for enchanced production. The diluent may be pyrites cinder, iron oxide, magnesium oxide, leached residue from a previous roast.

In still another specific embodiment there is provided an improved method for the removal of vanadium values from the alkali metal chromate product solutions recovered from the single or double roasting embodiments of the method of the present invention, which comprises adjusting the pH of the product solutions to a value between about 9 and 14, preferably about 11.5 to 13.5, admixing this solution with at least about 6 but no more than about 10, preferably 8-10 times the stoichiometric amount of compound of calcium while maintaining the temperature of the admixture so formed between about 70° and 90° C. for at least about 10 minutes, preferably at a temperature of about 80° C. for about 30 minutes, separating the admixture into a solid residue containing vanadium values and a solution containing alkali metal chromate values and soluble calcium, recovering the vanadium values, admixing the chromate solution containing soluble calcium with at least about 2.5 times the stoichiometric amount of alkali metal carbonate, e.g., $Na_2CO_3$, required to precipitate the soluble calcium, seperating the mixture so produced into solid calcium carbonate and a solution containing alkali metal chromate values, and recovering the alkali metal chromate values from this solution. The calcium compound is a member selected from the group consisting of CaO, Ca(OH), $CaCl_2$, $CaSO_4$, and mixtures thereof. In a preferred embodiment, CaO is used. The vanadium values can conveniently be recovered by ordinary chemical means.

The Bichromate Equivalent (B.E.) of the total chrome (T) in the mix or solution is employed often in the description of this invention. The Bichromate Equivalent (B.E.) is defined by the following expression:

Bichromate Equivalent =

$$\frac{\text{Mol. Wt. of } X_2Cr_2O_7 \cdot 2H_2O}{y \text{ times} \left\{ \begin{array}{l} \text{Mol. wt. of chrome compound or} \\ \text{Mol. wt. of alkali metal chrome compound} \end{array} \right\}} (T)$$

where x = the alkali metal in alkali metal bichromate,
  y = 1 when chrome compound or alkali metal chrome compound contains two Cr atoms, and
    = 2 when chrome compound or alkali metal chrome compound contains one Cr atom.
  T = the weight in grams, of chrome compound to be expressed as Bichromate Equivalent.

Thus, when sodium chromate is the chrome compound, the B.E. is given by the following expression:

$$B.E. = \frac{298}{2 \times 162} (T) = 0.9198 \cdot (T)$$

in which T is the weight in grams, of the sodium chromate.

DESCRIPTION OF PREFERRED EMBODIMENTS

As pointed out above, it is well known that alkali metal chromate values can be recovered from so-called chrome ores or chromite ores by disintegrating the ores in the presence of an alkali metal salt, usually soda ash ($Na_2CO_3$), and an additional material often called a diluent such as lime, magnesium oxide, recycled residue from a previous roasting step, or the like, at a temperature in the range of 900°–1200° C. The roasting is normally carried out in rotary kilns or hearth furnaces of various types. The material to be roasted will normally be passed through the furnaces countercurrently to hot oxygen-containing gases and the furnaces are preferably directly heated by the combustion of carbon-containing materials. The alkali metal salt used is normally soda ash and is used either in a stoichiometric quantity, in a deficient amount or in excess over the stoichiometric amount based on the chromite ore to be disintegrated as well as on the process conditions employed. These processes have been carried out by both single and double roast methods utilizing various conditions for their operation.

The present invention provides novel methods by which alkali metal chromates may be produced and recovered from chrome ores using roasting methods which can be carried out in the absence of added alkaline earth materials such as lime or other calcium oxide-containing materials. In the present invention single and double roasting methods for manufacturing chromates are provided wherein negligible amounts of alumina are extracted into the product liquor and the previous requirement of special steps to remove alumina from product liquors is obviated. These advances have been achieved by controlling the Bichromate Equivalent to aluminum oxide ratio in the mix, controlling the weight percent of alkali metal salts such as soda ash ($Na_2CO_3$) added to the mix, controlling the roasting time, and the alkalinity and composition of liquor used for leaching the roast, as well as the temperature of both roasting steps, within certain optimum ranges. It has been found that the lime-free roasts of this invention provide advantages in reducing the costs of removing alumina from these product liquors as well as saving costs of adding the lime raw materials. The systems also substantially eliminate pollution, hygiene and plant production problems associated with the use of the lime. Further, both the single and double roasting method increase plant production capacity and decrease energy consumption by operating at lower temperatures; the double roast operates to produce enhanced yields. Further, by the elimination of lime from the roast the amount of residue or refuse discarded is decreased by up to 40% so that the existing disposal sites can be used for longer periods.

In the prior art it was generally believed that if lime was not used in the mix, soluble aluminum would be extracted into product liquor and therefore provision had to be made for removal of soluble aluminum from the product liquor. However, it has been found according to the present invention that if suitable conditions within certain desired limits are maintained, the formation of alkali metal chromate over the aluminate well predominate, which makes solubilization of the alumina negligible.

In general, the roasting of chromite ore with soda ash in the presence of oxygen to form alkali metal chromates proceeds according to the following equation:

$$Cr_2O_3 + 3/2O_2 + 2Na_2CO_3 \rightarrow 2Na_2CrO_4 + 2CO_2 \quad (1)$$

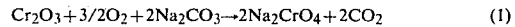

The chromite ore however, also contains alumina ($Al_2O_3$) which can react with the soda ash according to the following equation:

$$Al_2O_3 + Na_2CO_3 \rightarrow 2NaAlO_2 + CO_2 \quad (2)$$

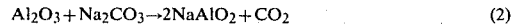

The sodium aluminate formed can further react with chromium oxide present to form alkali metal chromate as follows:

$$4NaAlO_2 + Cr_2O_3 + 3/2O_2 \rightarrow 2Na_2CrO_4 + 2Al_2O_3 \quad (3)$$

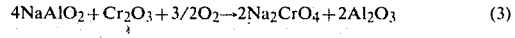

The present invention provides conditions which cause reactions (1) and (3) to occur preferentially over the reaction of equation (2) whereby the sodium chromate can be formed with negligible solubilization of alumina in the system. Thus, reactions (1) and (3) occur preferentially over reaction (2), when the $Cr_2O_3$ concentration is increased and the aluminum oxide concentration is decreased in the roasting mix. It has been found that controlling the Bichromate Equivalent/aluminum oxide ratio in the mix, providing longer roasting times, and insufficient alkali in the mix, cause (1) and (3) to predominate in this system.

It has therefore been discovered according to the present invention that the following conditions are necessary to provide a process wherein chromate formation predominates and negligible alumina is extracted into the product liquor. These conditions are achieved by controlling the following variables:

(1) the Bichromate Equivalent/aluminum oxide ratio in the mix;

(2) the amount of alkali added to the mix (percent stoichiometric alkali in mix);

(3) the roasting time in kiln; and (4) the alkalinity and composition of the leach liquor.

Therefore, single and double roasting methods of producing alkali metal chromate have been found which do not require the incorporation of alkaline earth materials such as lime to control the extraction of alumina. Thus, it has been found that by controlling the Bichromate Equivalent/alumina ratio, the amount of alkali, total roasting time of the chrome and the composition and alkalinity of leaching liquor, that the soluble aluminates in the product liquors can be minimized to acceptable levels.

The diluent described herein above as one of the components of the roast mix may be selected from a wide variety of refractory materials. A partial list of such materials includes pyrites cinder, powdered iron oxide, magnesium oxide and leached residue from a previous roast. Of course materials which contain or produce lime are to be avoided. With the exception of such materials any diluent which does not interfere with the process of the present invention is considered within the scope thereof. Leached residue from a previous roast is the preferred diluent. In specific embodiments of the single and double roast, the leached residue from a previous roast has been increased in the roast mixture of the single roast and in the initial roasting step of the double roast in order to replace the lime used in the mix because the leached residue acts as a diluent in controlling the liquid-solid ratio and fusing of roast in the kiln.

When a double roast is employed, the first roast mix consists of chrome ore, soda ash and leached residue; at least a portion of the residue left after leaching may be recycled back to the process to provide the necessary residue. Thus, a part of the residue is used in the first roast as a diluent and the remaining residue may be roasted in the second stage with additional soda ash. The residue left after the second roast may be either discarded or a portion recycled to the first and/or second roasting step of the double roast method.

In the process of the invention, it has been found that for any given Bichromate Equivalent/aluminum oxide ratio in the mix there exists a critical level of soda ash or other alkaline salt below which the extraction of alumina into product liquors is negligible. As the soda ash increases above the critical level the extraction of alumina into the product chromate liquor increases very rapidly.

In the broadest embodiment of the single roast method of the present invention, it has been found that the Bichromate Equivalent/aluminum oxide ratio should range from 1.5:1 to 10:1, preferably 3:1 to 4:1 while maintaining the amount of alkali metal salts such as soda ash, in a range of about 30 to 80%, preferably 40 to 55% of the stoichiometric amount required to react with the chromium in the ore without producing unacceptable amounts of alumina in the product chromate liquors.

According to double roasting method of the present invention, it has been found that the Bichromate Equivalent/aluminum oxide ratio should range from 3:1 to 10:1, preferably 4:1 to 5:1 in the first roast and from 1.5:1 to 4:1, preferably 2:1 to 3:1 in the second roast. Further, the amount of alkali metal salts such as soda ash, is maintained in the mix at a critical value below the stoichiometric amount required without liquors producing unacceptable amounts of alumina in the product chromate liquors. This critical value, which depends on the Bichromate Equivalent (B.E.) to aluminum oxide ratio in the system must be maintained in a range of about 35 to 80%, preferably about 35 to 55%, and most preferably about 40 to 45% of the stoichiometric amount in the first roast and in a range of about 30 to 60%, preferably about 40 to 60%, and most preferably about 45 to 55% of the stoichiometric amount in the second roast. In general, the lower ratios of $B.E./Al_2O_3$ require lower critical amounts of soda ash. Thus, it may be stated that as the Bichromate Equivalent to alumina ratio decreases in the system the critical level of alkali metal salt, e.g. soda ash, also decreases.

While the soda ash ($Na_2CO_3$) is the preferred alkali metal salt to be maintained in the system in the production of sodium chromate or sodium dichromate, it is of course to be understood that other alkali metal salts such as sodium bicarbonate, potash, sodium sulfates, potassium sulfates, potassium carbonate, lithium carbonate, sodium sesquicarbonate and mixtures thereof may also be employed.

It has also been found that the roasting time is critical in maintaining acceptably low levels of alumina in the product chromates. In the single step method, the roasting time is about 30 minutes or higher, preferably about 45 to 360 minutes. When the double step method is employed the roasting time in the first step is about 30 minutes or higher, preferably about 30 to 360 minutes, while in the second step a roasting time of more than about 30 minutes, preferably about 45 to 360 minutes, is required to give the best results. In accordance with the present invention, for a given $B.E./Al_2O_3$ ratio and the percent stoichiometric alkali metal salt in the mix, the extraction of alumina into the product liquor decreases as the roasting time increases above about 30 minutes in the single roast, above about 30 minutes in the first step and above about 30 minutes in the second step of double roast. Depending on the type of roasting equipment used, roasting times may extend as high as about 360 minutes in both methods.

As indicated above, the system is operated wherein in a roasting step, the chrome ore, the sodium salt and a diluent such as pyrites cinder, iron oxide magnesium oxide or leached residue from a previous roast, preferably leached residue from a previous roast are reacted in the presence of an oxygen-containing gas in a kiln, hearth furnace or the like. When either air or pure oxygen is employed as the oxygen-containing atmosphere in both roasting methods, similar results are obtained. When the single roast method is employed, it has been found that the reaction temperature should range from about 900° to 1200° C. and preferably from 1100° to 1200° C. When the double roast method is used, it has been found that the temperature to be maintained in the first roasting step should range from about 900° to 1200° C. and preferably from 900° to 1050° C. This is critical since temperatures above or below these levels effect deleterious results. Therefore, the temperature ranges given represent highly preferred embodiments.

On completion of a roasting step in the single and double roast, the resulting roast is then preferably cooled to the range of 700°–800° C. as a practical matter to avoid special apparatus and the alkali metal chromate values are leached from the roast to separate these values from a resulting residue. A further feature of the present invention is that the leach liquor should have a pH ranging from about 4.5 to 12, preferably about 5 to 8 as it has been found that the extraction of alumina into the leach liquor decreases as the alkalinity decreases. The leach liquor may comprise water, weak chromate liquors, or mixtures of weak chromates and dichromate liquors, but should be in the pH range of about 4.5 to 12, preferably about 5 to 8 in order to minimize alumina extraction.

After the leaching step is completed the alkali metal chromate values are then recovered from the leach liquor or utilized for the production of other materials as in the production of alkali metal chromate by known methods.

When the double roast is employed, the dried residue recovered from the first leaching is then preferably divided into two portions with one portion being returned to the first roasting step to provide diluent for the system as described above. The second portion is then further roasted with alkali metal salt, preferably soda ash, in the absence of added lime but under conditions similar to the first roast and in an oxidizing atmosphere and wherein the Bichromate Equivalent to alumina ratio described is maintained in the mix. Additional chrome ore may optionally be added to the second roasting step for enhanced production. The temperature in the second roast may range from about 900°–1200° C., preferably about 1100° to 1200° C. The roasting time in the second roast is increased to 45 minutes to minimize the extraction of alumina into the product liquor. On completion of the second stage, the roast is removed and leached as described above to recover additional alkali metal chromate values. The resulting residue may be recovered and discarded or a portion thereof may be recycled to the first and/or second roasting step of the process. When a single roast is employed, the leached residue remaining after satisfying mix requirements is discarded as refuse.

It has been found that the process of the present invention provides advantages over previous practice by the elimination of the handling and processing of lime previously used, improves the leachability of the roast sinter, improves the hygiene of the complete process and causes a reduction in pollution by eliminating the formation of calcium chromate compounds in the discarded residue and results in a substantial reduction in the amount of refuse which must be discarded and also by operating at lower temperatures, lowers fuel costs for the process.

The following Examples are presented to further illustrate the present invention and set forth the best mode presently contemplated for its practice. Unless otherwise indicated parts are by weight.

EXAMPLE 1

This example shows that for a $B.E./Al_2O_3$ ratio of 6, the amount of soda ash employed in the mix has a direct bearing on the extraction of alumina into the product liquor.

Montrose ore containing 89.2% chrome as B.E. and 14.87% Al$_2$O$_3$ is roasted with various levels of soda ash in an oxidizing atmosphere. The roasting time is 30 minutes, and roasting temperature is 1177° C. The roast is cooled and leached with water. The alumina extracted into leach liquor is given below.

| B.E./Al$_2$O$_3$ ratio in the mix = 6 | |
|---|---|
| Percent Stoichiometric Soda Ash in Mix | Product Liquors % Al$_2$O$_3$ C.T.B. |
| 30 | 0.24 |
| 50 | 0.24 |
| 70 | 0.32 |
| 100 | 12.32 |

(C.T.B - Compared to Bichromate, % Al$_2$O$_3$ C.T.B. - Percent alumina extracted per 100 lbs. of Bichromate Equivalent).

As used herein, the term "weight percent C.T.B." is intended to mean the weight percent of a given component of the aqueous solution calculated to bichromate basis, as determined by the following expression:

Weight Percent C.T.B. = W/B.E. × 100% wherein W corresponds to the actual weight in grams, of the component (e.g., alumina) in the aqueous alkali metal chromate solution, "B.E." in the "bichromate equivalent" described above.

EXAMPLE 2

In this example, a residue containing 43.2% B.E. and 18.9% Al$_2$O$_3$ is roasted with various amounts of soda ash for 30 minutes at 1177° C. in an oxidizing atmosphere. The roast is leached with water and the alumina extracted into product liquor is given below.

| B.E./Al$_2$O$_3$ ratio in the mix = 2.29 | |
|---|---|
| % Stoichiometric Soda Ash | Product Liquor % Al$_2$O$_3$ C.T.B. |
| 45 | 2.64 |
| 60 | 32.0 |
| 75 | 44.2 |

The results indicate the critical level of soda ash is between 45 and 60% of the stoichiometric amount when the B.E./Al$_2$O$_3$ ratio of 2.29.

From examples 1 and 2 it is evident that the critical level of soda ash depends on the B.E./Al$_2$O$_3$ ratio. As the B.E./Al$_2$O$_3$ ratio decreases, the critical level of soda ash also decreases.

EXAMPLE 3

This example demonstrates that in addition to B.E./Al$_2$O$_3$ ratio and percent ash in the mix, that roasting time affects the extraction of alumina. It is found that the extraction of alumina decreases as the roasting time increases.

A residue containing 41.2% B.E. and 16.7% Al$_2$O$_3$ is mixed with soda ash. The mixture contained 62% of the stoichiometric alkali based on chrome content, and is roasted in an oxidizing atmosphere at 1177° C. for different time periods. The roast is cooled before leaching with water. The amount of alumina extracted into the product liquors is minimized when the roasting time is 45 minutes or longer.

| B.E./Al$_2$O$_3$ ratio in the mix = 2.47 | |
|---|---|
| Roasting Time Minutes | Product Liquors % Al$_2$O$_3$ C.T.B. |
| 30 | 6.92 |
| 45 | 1.68 |
| 60 | 1.59 |

EXAMPLE 4

This example illustrates that in addition to B.E./Al$_2$O$_3$ ratio, percent soda ash in the mix, and roasting time, that the alkalinity of leach liquor affects the extraction of alumina. The extraction of alumina decreases as the alkalinity of leach liquors decreases.

A mixture of 31.7 parts ore, 15.5 parts soda ash and 52.8 parts recycled residue is roasted in an oxidizing atmosphere at 1177° C. for 30 minutes. The ore contained 89.4% chrome as B.E., and 13.8% Al$_2$O$_3$. On recycling of residue in the roast mix, the B.E. content of the mix varies from 50.7 to 52.8%, and the Al$_2$O$_3$ from 11.4 to 13.9%. After roasting as described above, the roast is cooled to 700° C. before leaching. Liquors used for leaching are either water, aqueous solutions containing sodium chromate, or a mixture of sodium chromate and dichromate.

| B.E./Al$_2$O$_3$ ratio (avg.) = 4.12 | | |
|---|---|---|
| | Product Liquors | |
| pH of Liquor Used for Leaching Roast | % Al$_2$O$_3$ C.T.B. | % Alkali (As Na$_2$CO$_3$) C.T.B. |
| 12 | 2.49 | 4.15 |
| 12 | 1.88 | 3.31 |
| 12 | 0.91 | 1.59 |
| 12.3 | 0.70 | 1.31 |
| 8 | 0.06 | 0.49 |
| 8 | 0.05 | 0.48 |
| 5 | 0.02 | — |

EXAMPLE 5

This example illustrates that the optimum temperature range required for the operation of a lime-free first roast is 900° to 1200° C., instead of 1100° to 1200° C. as previously thought necessary. The economic benefits effects by this lower temperature range are obvious.

A mixture of 31.7 parts (wt.) chrome ore, 15.5 parts (wt.) soda ash, and 52.8 parts (wt.) recycled residue is roasted in a suitable furnace under an oxygen-containing atmosphere at a temperature of 800° C. Three similar experiments are run at temperatures of 900°, 1000° and 1177° C. The B.E./Al$_2$O$_3$ ratio in each mix is maintained at about 4.0. Roast samples are removed at various time intervals up to 60 minutes. The roasts are cooled and leached of chromate values.

Results for samples roasted for 30 minutes are given in the table below. Similar results are obtained at longer time intervals.

| Roasting | | Lbs. B.E. Extracted |
|---|---|---|
| Temperature °C. | Time Minutes | per 100 lbs. Mix |
| 800 | 30 | 5.28 |
| 900 | 30 | 17.84 |
| 1000 | 30 | 21.11 |
| 1177 | 30 | 19.70 |

EXAMPLE 6

This illustrates a preferred embodiment of the double roast system of the present invention utilizing the specific criteria discovered for this process.

A first roast charge is prepared by intimately mixing 31.7 parts (wt.) chrome ore, 15.5 parts (wt.) soda ash and 52.8 parts (wt.) recycled residue from a previous first roast. The B.E./$Al_2O_3$ ratio in the mix is maintained at 4.66. The soda ash employed in this first roast is 43.35% of stoichiometric amount required. The chrome is reacted with the soda ash in a kiln under an oxygen-containing atmosphere at the optimum temperature of 1050° C. for an optimum roasting time of 30 minutes. The resulting roast is cooled and leached of chromate values using mixtures of weak chromate and dichromate liquors and water according to the known multistage counter current process. The pH of the leach liquors is varied between about 6.2 to about 7.0 to minimize alumina extraction.

The results of the counter current leaching of the first roast are given below.

| Solution | Initial pH of Leach Liquor | Composition of Product Liquor | |
|---|---|---|---|
| | | Grams B.E. per 100g of Liquor | % $Al_2O_3$ C.T.B. |
| 1[a] | 6.8 | 41.3 | 0.024 |
| 2[a] | 6.72 | 24.08 | 0.021 |
| 3[a] | 6.92 | 8.55 | 0.016 |
| 4[b] | 6.5 | 1.72 | 0.093 |

[a] mixture of weak chromate and dichromate liquors
[b] distilled water

The strong chromate liquor obtained on leaching the roast contains 41.3 g B.E. per 100 g of liquor and negligible amounts (0.024% $Al_2O_3$ C.T.B.) of alumina, and so no special step is required to remove this alumina.

Residue obtained on leaching the roast is dried and pulverized, and a portion is recycled back into first roast mix. The remainder is used for a second roast operation.

A second roast charge is prepared by intimately mixing about 86% residue from a previous stage and 14% soda ash. The B.E./$Al_2O_3$ ratio in the mix is maintained at 2.9 and the critical level of soda ash below which the extraction of alumina is minimized is 54.4% of the stoichiometric amount required. The trivalent chrome left in the residue reacts with the soda ash in an oxygen-containing atmosphere at the optimum temperature of 1177° C. in a kiln for an optimum roasting time of 45 minutes. The second roast, so produced, is cooled and leached as described above for the first roast.

The results of the counter-current leaching of the second roast are given in the table below.

| Solution | Initial pH of Leach Liquor | Composition of Product Liquor | |
|---|---|---|---|
| | | Grams B.E. per 100g of Liquor | % $Al_2O_3$ C.T.B. |
| 1[a] | 6.71 | 47.06 | 0.04 |
| 2[a] | 6.63 | 32.09 | 0.019 |
| 3[a] | 6.97 | 15.67 | 0.017 |
| 4[b] | 6.2 | 4.11 | 0.041 |

[a] mixture of weak chromate and dichromate liquors
[b] distilled water

The residue or refuse obtained from leaching the second roast is either discarded or a portion is recycled to the process to provide the necessary residue for both the first and second roast.

EXAMPLE 7

This example illustrates a preferred embodiment of the single roast system of the present invention utilizing the specific criteria discovered for this process. In a single roast system, residue remaining after satisfying mix requirements is discarded as refuse.

A roast charge is prepared by intimately mixing 24.0 parts (wt.) chrome ore containing 45.0% wt. chrome as $Cr_2O_3$, 14.0 parts (wt.) soda ash, and 62 parts (wt.) recycled residue from a previous roast. The B.E./$Al_2O_3$ ratio in the mix is maintained at 3.0. The soda ash employed in this roast is 53.07% of stoichiometric amount required. The roast charge is reacted in a kiln under an oxygen-containing atmosphere at 1150° C. for a roasting time of 30 minutes. The resulting roast is cooled and leached of chromate values using mixtures of weak chromate and dichromate liquors, and water according to known multistage counter current processes. The pH of the liquors used to leach the roast is varied between 6.9 and 6.2.

The results of the counter current leaching of the roast are given below.

| Solutions | Initial pH of Leach Liquors | Compositions of Product Liquor | |
|---|---|---|---|
| | | Grams B.E. per 100g of liquor | % $Al_2O_3$ C.T.B. |
| 1[a] | 6.90 | 32.1 | 0.02 |
| 2[a] | 6.95 | 21.2 | 0.01 |
| 3[b] | 6.5 | 8.5 | 0.02 |
| 4[b] | 6.5 | 2.7 | 0.06 |

[a] mixture of weak chromate and dichromate liquors
[b] distilled water

The strong chromate liquor obtained on leaching the roast contained 32.1 g B.E. per 100 g of liquor and negligible amounts (0.02% $Al_2O_3$ C.T.B.) of alumina, and so no special step is required to remove this alumina.

The residue obtained here contained 28.5% (intial) total chrome expressed as B.E. or 9.95% wt. total chrome expressed as Cr.

EXAMPLE 8

The following example demonstrates the use of pyrites cinder as a lime-free roast diluent, and leaching of roast without prior cooling.

A roast charge is prepared by intimately mixing 31.2 parts (wt.) chrome ore containing about 89.4 parts (wt.) chrome as B.E., 13.8 parts (wt.) soda ash, and 55.0 parts (wt.) pyrites cinder. The soda ash used to make up the roast charge is 69.5% of the stoichiometric amount required. The roast charge is reacted for 30 minutes at about 1050° C. in a kiln under an oxygen-containing atmosphere. The ratio of B.E./$Al_2O_3$ in the roast is maintained at 6:1.

After reaction, the hot roast having a temperature at or near the roasting temperature is leached of chromate values with liquors containing mixtures of weak sodium chromate and sodium dichromate liquors and water according to the known counter current process. The roast contains about 13–14 parts (wt.) water soluble chrome as B.E., and 4.8 parts (wt.) $Al_2O_3$. The pH of the leach liquors is varied between 6.2 and 7.0 to minimize alumina extraction.

The following results are obtained:

| Solution | Initial pH of Leach Liquor | Compositions of Product Liquor | |
|---|---|---|---|
| | | Grams of B.E. per 100g of liquor | % Al$_2$O$_3$ C.T.B. |
| 1[a] | 6.85 | 39.82 | 0.012 |
| 2[a] | 7.00 | 23.76 | 0.017 |
| 3[b] | 6.20 | 9.92 | 0.012 |
| 4[b] | 6.20 | 4.79 | 0.025 |
| 5[b] | 6.20 | 0.68 | not detected |

[a] mixture of weak chromate and dichromate liquors
[b] distilled water

Results indicate that the use of pyrites cinder as inert roast diluent and leaching the roast mixture having a temperature near the kiln roast temperature does not have deliterius effect on the process.

EXAMPLES 9-11

The following examples demonstrates the use of roast diluents other than leached residue from a previous roast.

Roast charges are prepared by thoroughly mixing 31.7 parts (wt.) chrome ore containing 45.0% wt. chrome as $Cr_2O_3$, 14.5 parts (wt.) soda ash, and 53.8 parts (wt.) diluent which is either pyrites cinder, powdered ferric oxide, magnesium oxide. In all cases, the soda ash used to make up the roast charge is 72.1% of the stoichiometric amount required. The foregoing mixtures are reacted for 30 minutes at 1177° C. in a kiln under an oxygen-containing atmosphere. The resulting roast is cooled and leached with water to recover chromate values.

Results from water leaching of the roast are shown below.

| Example | Diluent | Compositions of Product Liquor | |
|---|---|---|---|
| | | Grams B.E. Extracted per 100g of liquor | % Al$_2$O$_3$ C.T.B. |
| 9 | Pyrites Cinder[a] | 10.7 | 0.25 |
| 10 | Magnesium oxide[a] | 15.8 | 6.04 |
| 11 | Powdered ferric oxide[a] | 16.6 | 1.18 |

[a] B.E./Al$_2$O$_3$ ratio in each mix is maintained at about 6.0.

Negligible amounts of iron or magnesium were found in resulting leach liquors. In these examples, the pH of counter current leaching was not controlled. However, it is anticipated that if the pH of the leaching were controlled at a value between 5 and 10, alumina extraction would be minimized as in Examples 6, 7 and 8.

EXAMPLE 12

This example sets forth the best mode contemplated for removal of vanadium from the sodium chromate liquors recovered from leaching the lime-free roast mixture.

To 1900 g of sodium chromate liquor having 32.71 g. B.E. per 100 g of liquor and containing 0.19% V C.T.B. (0.0625 weight %) less than 0.001% Ca C.T.B. (0.0002 weight %), and 0.002% Al$_2$O$_3$ C.T.B. (0.0005 weight %) is added 43.9 g of 53.7 weight % NaOH solution. The pH of the liquor increased from 7.5 to 9.5. Ten times the stoichiometric amount of calcium oxide (6.82 g) is added to this liquor and the resultant slurry is stirred at 183° F. (84° C.) for 10 minutes. Filter aid is added and the slurry is filtered under a positive pressure to give 1.07 g (dry weight) of filter cake and a filtrate having 32.35 g B.E. per 100 g of liquor, less than 0.001% V C.T.B. (0.0003 weight %) and 0.161% Ca C.T.B. (0.052 weight %); the pH of the filtrate is 11.6. The residual calcium in the liquor is removed by addition of 2.5 times the stoichiometric amount of $Na_2CO_3$ required by a procedure similar to that described in Example 13 below.

EXAMPLE 13

This example sets forth the best mode contemplated for the removal of soluble calcium from the sodium chromate liquor treated to remove vanadium as described in Example 12.

To 1016.5 g of sodium chromate liquor (pH=11.5) having 31.60 g B.E. per 100 g of liquor and containing less than 0.001% V C.T.B. (0.0003 weight %) and 0.161% Ca C.T.B. (0.0508 weight %) is added 3.41 g of $Na_2CO_3$ 2.5 times the stoichiometric amount required to precipitate $CaCO_3$. After stirring at 84° C. for 10 minutes the resultant slurry is filtered under pressure. The filtrate (pH=11.6) is analyzed to contain 31.30 g B.E. per 100 g of liquor and 0.001% Ca C.T.B. (0.0004 weight %); negligible amounts of alumina and vanadium were present.

EXAMPLE 14

To 110.0 g of filter cake containing 26.7% V as $NaVO_3$ (dry basis) recovered from sodium chromate liquors by a procedure similar to that described in Example 12 is added 50 g of $H_2O$ and 72.5 g of $NaHCO_3$. The resultant slurry is stirred at 80°-95° C. for 3 hrs. and then filtered. The combined filtrate (232.5 g) has a pH of 9.7 and contained 60 g of $V_2O_5$ per liter of filtrate (6.89 weight % $NaVO_3$). This corresponded to extraction of 99 weight % of the $NaVO_3$ from the filter cake.

Since various changes and modifications may be made in the invention without departing from the spirit and essential characteristics thereof, it is intended that all matter contained in the above descriptions shall be interpreted as illustrative only, the invention being limited only by the scope of the appended claims.

We claim:

1. A method for the manufacture of alkali metal chromates having a low alumina content, which comprises the following steps:
   (a) reacting a mixture comprising chrome ore, a diluent and an alkali metal salt, the amount of alkali metal salt being in the range of from about 30 to 80 percent of the stoichiometric amount required to react with chrome in said mixture, in an oxygen-containing atmosphere at a temperature of from about 900° to 1200° C., for a time period of at least about 30 minutes while maintaining a Bichromate Equivalent to aluminum oxide ratio in said mixture in the range of from about 1.5:1 to 10:1;
   (b) leaching the roast mixture with a leach liquor having a pH of about 4.5 to 12 to remove the alkali metal chromate values and to form a roast mix residue; and
   (c) recovering alkali metal chromate values.

2. A method as described in claim 1 wherein in step (a) the diluent is a member selected from the group consisting of leached residue from a previous roast, iron oxide, pyrites cinder, magnesium oxide, and mixtures thereof.

3. A method as described in claim 1 wherein in step (a) the diluent is leached residue from a previous roast.

4. A method as described in claim 1 wherein the temperature in step (a) is from about 1100° to 1200° C.

5. A method as described in claim 1 wherein the alkali metal salt is a member selected from the group consisting of sodium carbonate, sodium bicarbonate, potassium carbonate, sodium sulfate, potassium sulfate, potassium carbonate, lithium carbonate, sodium sesquicarbonate and mixtures thereof.

6. A method as described in claim 1 wherein in step (a) the time period is from about 45 to 360 minutes.

7. A method as described in claim 1 wherein in step (b) the leach liquor is a member selected from the group consisting of water, an aqueous solution of sodium chromate and mixtures of aqueous solutions of sodium chromate and sodium dichromate and has a pH between 5.0 and 8.0.

8. A method as described in claim 1 wherein in step (a) the amount of alkali metal salt is in the range of from about 40 to 55 percent of the stoichiometric amount required and the Bichromate Equivalent to aluminum oxide ratio in the mix is maintained in the range of about 3:1 to 4:1.

9. A method as described in claim 1 wherein the alkali metal salt is sodium carbonate.

10. A method as described in claim 1 wherein in step (b) the roast mixture is cooled before leaching.

11. A method as described in claim 10 wherein at least a portion of the roast mix residue is recycled to step (a).

12. A method as described in claim 1 which further comprises the following steps for recovery of vanadium values from the alkali metal chromate values recovered in step (c):
   (a) adjusting the pH of the solution of alkali metal chromate values to a value between about 9 and 14;
   (b) admixing the solution from step (a) with at least 6 but no more than about 10 times the stoichiometric amount of a member selected from the group consisting of CaO, Ca(OH)$_2$, CaCl$_2$, CaSO$_4$ and mixtures thereof while maintaining the temperature of the admixture so formed between about 70° and about 90° C. for at least about 10 minutes;
   (c) separating the admixture into a solid residue containing vanadium values and a solution containing alkali metal chromate values and soluble calcium;
   (d) recovering the vanadium values from the solid residue;
   (e) admixing the solution from step (c) with at least about 2.5 times the stoichiometric amount of alkali metal carbonate required to precipitate the soluble calcium;
   (f) separating the mixture so produced into solid calcium carbonate and a solution containing alkali metal chromate values; and
   (g) recovering the alkali metal chromate values from the solution in step (f).

13. A method as described in claim 12 wherein in step (a) the pH is adjusted to between about 11.5 and 13.5.

14. A method as described in claim 12 wherein the alkali metal is sodium.

15. A method as described in claim 12 wherein the alkali metal is potassium.

16. A method for the manufacture of alkali metal chromates having a low alumina content, which comprises the following steps:
   (a) reacting a mixture comprising chrome ore, roast mix residue and alkali metal salt, the amount of alkali metal salt being in the range of from 40 to 55 percent of the stoichiometric amount required to react with chrome in said mixture, in an oxygen-containing atmosphere at a temperature from about 1100° to 1200° C. for a time period of about 45 to 360 minutes while maintaining a Bichromate Equivalent to aluminum oxide ratio in said mixture in the range from about 3:1 to 4:1;
   (b) cooling the roast mixture and leaching said cooled mixture with a leach liquor having a pH between about 5.0 and 8.0 to remove the alkali metal chromate values and to form a roast mix residue, said leach liquor being a member selected from the group consisting of water, an aqueous solution of sodium chromate and mixtures of aqueous solutions of sodium chromate and sodium dichromate;
   (c) recovering the alkali metal chromate values; and
   (d) recycling at least a portion of said residue from step (b) to step (a).

17. A method for the manufacture of alkali metal chromates having a low alumina content, which comprises the following steps:
   (a) reacting in a first roasting step a mixture comprising chrome ore, a diluent and an alkali metal salt, the amount of alkali metal salt being in the range of from about 35 to 80 percent of the stoichiometric amount required to react with chrome in said mixture, in an oxygen-containing atmosphere at a temperature of from about 900° to 1200° C. for a time period of at least about 30 minutes while maintaining a Bichromate Equivalent to aluminum oxide ratio in said mixture in the range of from about 3.0:1 to 10:1;
   (b) leaching the first roast mixture with a leach liquor having a pH between 4.5 to 12 to remove the alkali metal chromate values and to form a first roast mix residue;
   (c) reacting in a second roasting step a second mixture comprising at least a portion of said residue and an additional amount of alkali metal salt, the amount being about 30 to 60 percent of the stoichiometric amount of alkali metal salt required to react with the chrome in said mixture, in an oxygen-containing atmosphere at a temperature of from about 900° to 1200° C. for a time period of at least about 45 minutes while maintaining a Bichromate Equivalent to aluminum oxide ratio in the second reaction mixture in the range of from about 1.5:1 to 4:1;
   (d) leaching the resulting second roast mixture with a leach liquor having a pH between 4.5 to 12 to remove said alkali metal chromate values; and
   (e) recovering the alkali metal chromate values from the leach liquor removed in steps (b) and (d).

18. A method as described in claim 17 wherein the reaction in step (c) is effected in the presence of additional chrome ore.

19. A method as described in claim 17 wherein step (a) the diluent is a member selected from the group consisting of leached residue from a previous roast, iron oxide, pyrites cinder, magnesium oxide and mixtures thereof.

20. A method as described in claim 17 which further comprises the following steps for recovery of vanadium values from the alkali metal chromate values recovered in step (e):
   (a) adjusting the pH of the solution of alkali metal chromate values to a value between about 9 and 14;

(b) admixing the solution from step (a) with at least about 6 but no more than about 10 times the stoichiometric amount of a member selected from the group consisting of CaO, Ca(OH)$_2$, CaCl$_2$, CaSO$_4$ and mixtures thereof while maintaining the temperature of the admixture so formed between about 70° and about 90° C. for at least about 10 minutes;

(c) separating the admixture into a solid residue containing vanadium values and a solution containing alkali metal chromate values and soluble calcium;

(d) recovering the vanadium values from the solid residue;

(e) admixing the solution from step (c) with at least about 2.5 times the stoichiometric amount of alkali metal carbonate required to precipitate the soluble calcium;

(f) separating the mixture so produced into solid calcium and a solution containing alkali metal chromate values; and (g) recovering the alkali metal chromate values from the solution in step (f).

21. A method as described in claim 20 wherein in step (a) the pH is adjusted to between about 11.5 and 13.5.

22. A method as described in claim 20 wherein the alkali metal is sodium.

23. A method as described in claim 20 wherein the akali metal is potassium.

* * * * *